United States Patent [19]

Evans et al.

[11] Patent Number: 5,419,903
[45] Date of Patent: May 30, 1995

[54] PRODUCT AND PROCESS OF MAKING BISCUITS WITH A CORRUGATED CONFIGURATION

[75] Inventors: Garfield G. Evans, Oxon; Malcolm S. Wilkes, Berkshire; Debra Rycraft, Middlesex; Adrian G. Dodson, Surrey; Geoffrey M. Townsend, Bucks, all of England

[73] Assignee: United Biscuits (UK) Limited, Edinburgh, Scotland

[21] Appl. No.: 74,831

[22] PCT Filed: Dec. 12, 1991

[86] PCT No.: PCT/GB91/02213
§ 371 Date: Jun. 14, 1993
§ 102(e) Date: Jun. 14, 1993

[87] PCT Pub. No.: WO92/10101
PCT Pub. Date: Jun. 25, 1992

[30] Foreign Application Priority Data

Dec. 12, 1990 [GB] United Kingdom ............... 9026991

[51] Int. Cl.⁶ ..................... A21C 11/02; A21D 8/02
[52] U.S. Cl. ........................... 426/144; 426/94; 426/502; 426/517; 426/549; 426/552; 426/553
[58] Field of Search ............... 426/94, 144, 549, 552, 426/553, 517, 502

[56] References Cited

U.S. PATENT DOCUMENTS

| | | | |
|---|---|---|---|
| 3,956,517 | 5/1976 | Curry et al. | 426/502 |
| 4,511,586 | 4/1985 | Fitzwater et al. | 426/144 |
| 4,680,191 | 7/1987 | Budd et al. | 426/144 |
| 4,855,151 | 8/1989 | Fielding | 426/144 |
| 4,973,481 | 11/1990 | Hunt et al. | 426/144 |

FOREIGN PATENT DOCUMENTS

| | | |
|---|---|---|
| 0387606 | 9/1990 | European Pat. Off. . |
| WO91/05483 | 5/1991 | European Pat. Off. . |
| 425853 | 3/1935 | United Kingdom . |
| 465242 | 5/1937 | United Kingdom . |
| 751948 | 7/1956 | United Kingdom . |
| WO90/08479 | 8/1990 | WIPO . |

Primary Examiner—Helen Pratt
Attorney, Agent, or Firm—Nixon & Vanderhye

[57] ABSTRACT

A process for producing biscuits comprises forming a dough into generally laminar portions each having a corrugated configuration and baking the portions to form biscuits. The corrugated configuration is such that the resistance to breaking of the biscuits is greater in a direction perpendicular to the direction in which the corrugations extend than in the direction in which the corrugations extend by a factor of at least 1.5. In a preferred process, dough is formed into a sheet 1b having a corrugated configuration (preferably by feeding a flat sheet of dough to a pair of corrugated rollers 6). Individual portions are cut out from the corrugated sheet 1b and baked to form the biscuits.

30 Claims, 12 Drawing Sheets

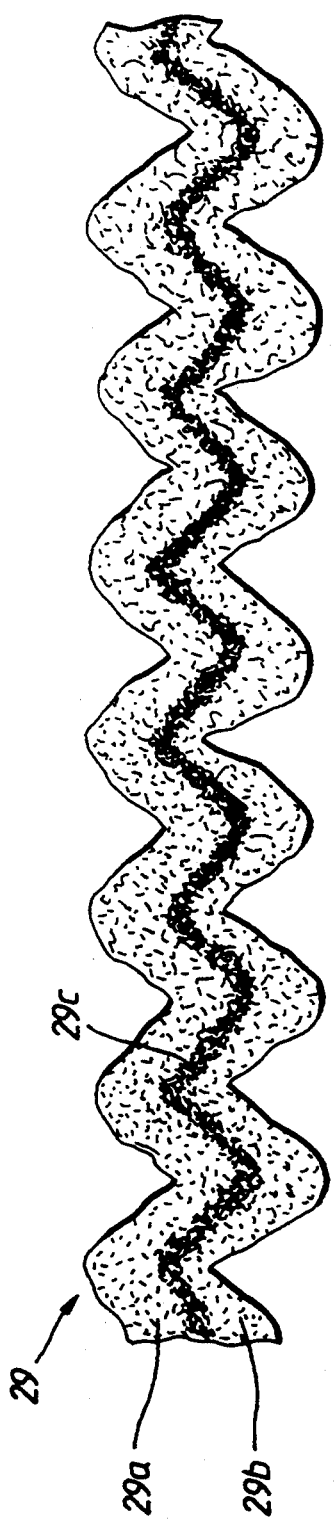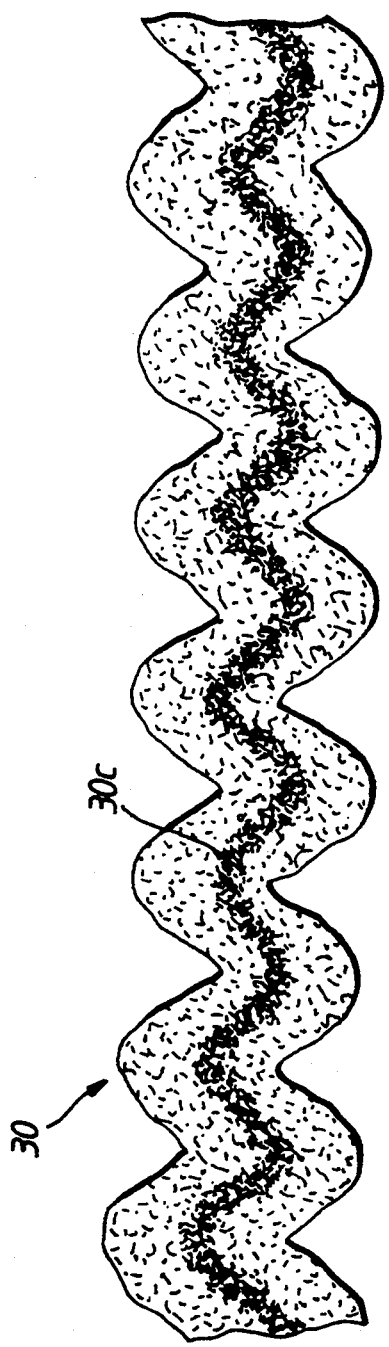
Fig. 24.
Fig. 25.

PRODUCT AND PROCESS OF MAKING BISCUITS WITH A CORRUGATED CONFIGURATION

The invention relates to biscuits.

There are recognized recipes for biscuit doughs, each of which produces a biscuit of a certain kind having characteristic qualities (in addition to taste) including hardness, crunchiness and crispness as perceived by a consumer. Those qualities depend mainly on the composition of the dough, principally, the fat and sugar content, but to some extent on the process by which the biscuit is produced and on the thickness of the biscuit.

At least in the case of certain kinds of biscuit, a decrease in the fat content could be beneficial to a consumer for dietary reasons, but decreasing the fat content of a particular kind of biscuit usually results in a reduction in perceived quality, for example, an increase in hardness, or a decrease in crunchiness or crispness. A decrease in the fat content, sufficient to be significant for dietary purposes, of a recognised dough recipe generally results in a biscuit that is less acceptable to the consumer.

It has now been found that the acceptability of a biscuit to a consumer can be increased if, instead of the biscuit being substantially equally likely to fracture along any line in the plane of the biscuit, it is markedly more likely to fracture along lines extending in a first direction in the plane of the biscuit than it is along lines extending in the plane of the biscuit in a second direction, the second direction being perpendicular to the first direction.

The invention provides a process for producing biscuits, which comprises forming a biscuit dough into a flat sheet, feeding that sheet to a pair of corrugated rollers which impart a corrugated configuration to the sheet, cutting generally laminar portions from the sheet, and baking the portions to form biscuits. Each biscuit has a corrugated configuration such that it has a fracture ratio, as hereinafter defined, of at least 1.5.

The invention also provides a biscuit having a corrugated configuration such that the fracture ratio (as hereinafter defined) of the biscuit is at least 1.5.

The expression "fracture ratio" of a biscuit is used throughout the specification to mean the ratio of the resistance to breaking (as hereinafter defined) of the biscuit in a direction perpendicular to the direction in which the corrugations extend to the resistance to breaking of the biscuit in the direction along which the corrugations extend. Thus, the fracture ratio is the factor by which the resistance to breaking in a direction perpendicular to the direction in which the corrugations extend exceeds the resistance to breaking in the direction in which the corrugations extend.

The expression "resistance to breaking", of a biscuit, in a specified direction, is used throughout the specification to mean the force required to break the biscuit when it is subjected to the following test. The biscuit is supported in an Instron Universal Penetrometer model 1140, which is an instrument that is well known in the art and is widely available. It is essentially a device for driving a probe towards an item to be tested at a constant speed (which can be set), and it includes a load cell having a maximum load capacity of 5000 g, which measures the force with which the advance of the probe is resisted by the item under test. The item to be tested has to be supported, and the means of support to be used here comprises two rollers which each have a diameter of 20 mm and of which the axes are parallel to one another, horizontal, and separated from each other by 52.5 mm.

The spacing of the axes of the rollers, on which a biscuit to be tested is supported, is stated above to be 52.5 mm for the sake of definiteness. It will usually be found, however, that increasing the separation to, say, 58 mm will not significantly affect the value of the fracture ratio (although it will alter the individual values of the resistance to breaking), and will tend to improve the reproducibility of the measurements of resistance to breaking. Accordingly, using a separation of 58 mm may permit a reduction in the number of biscuits that have to be tested to give a reliable value of the fracture ratio of the biscuits of a batch of supposedly identical biscuits. In the case of biscuits having a small linear dimension, say, 50 mm, in one or both of the relevant directions, the separation of the axes of the rollers has of course to be reduced to enable the rollers to support the biscuits.

For the purpose of measuring the "resistance to breaking" of a biscuit, the probe is in the form of a knife-edged member which extends at right angles to the direction of advance of the probe, and parallel to and midway between the axes of the rollers. The arrangement is such that the probe advances in a direction perpendicular to the plane of the biscuit, so that the knife-edged probe that makes contact with the biscuit extends parallel to the plane of the biscuit. Further, the probe is sufficiently long to extend over the maximum dimension of the biscuit in both a direction perpendicular to the corrugations and a direction in which the corrugations extend.

A biscuit is placed on the two supporting rollers with the direction of the corrugations of the biscuit parallel to the axes of the rollers. The knife-edged probe is moved down onto the surface of the biscuit at a speed of 50 mm min$^{-1}$. Because the biscuit is supported by the rollers, it is free to move under the action of the probe, so that the probe comes to abut the biscuit along the line of a trough between two adjacent corrugations.

Continuation of the movement of the knife-edged probe into the biscuit will eventually cause fracture of the biscuit along a line extending generally in the direction of the corrugations. Before fracture occurs, an increasing load is measured by the load cell, the output from which is fed to a chart recorder. The maximum load recorded before fracture is taken as a measure of the resistance to breaking of the biscuit in the direction in which the corrugations extend.

A second biscuit taken from the same batch is similarly tested except that it is so oriented that the direction in which the corrugations extend is perpendicular to the axes of the supporting rollers and to the direction in which the knife-edged probe extends. The maximum recorded output from the load cell is taken as a measure of the resistance to breaking of the biscuit in a direction perpendicular to the direction in which the corrugations extend.

If the biscuits are circular, they must each be so supported that the centre line of the probe lies (when the probe is in contact with the biscuit) along a diameter of the biscuit. If the biscuits are rectangular and the corrugations extend along the length or breadth of the biscuits, then the centre line of the probe should lie along the respective centre lines of the biscuits being tested.

Because what is being measured is the resistance to breaking, not of the biscuit material, but of a biscuit, the fracture ratio will, except in certain cases, for example, when the biscuit is circular, depend in part on the relative dimensions of the biscuit in the two directions. In particular, with a rectangular (and not square) biscuit, the fracture ratio will be smaller if the corrugations extend along the length of the biscuit than if they extend across the breadth of it.

It will be appreciated that, because what matters is how the biscuit breaks in the mouth, it is strictly better to take account, not of what may be termed the global fracture ratio (the fracture ratio of the entire biscuit, that is to say, the "fracture ratio" as defined above), but rather of what may be termed the local fracture ratio, that is to say, the fracture ratio determined as above but on a pair of circular test biscuits that differ from the biscuits under consideration only in their linear dimensions in the plane of the biscuits and possibly also in the shape of their perimeters. Such test biscuits have a diameter of, say, 50 mm, which is rather smaller than most commercially available biscuits. In practice, because biscuits are commonly circular, square, or rectangular and nearly square, the distinction between the fracture ratio of the biscuits and the local fracture ratio will not differ significantly. In the case of rectangular biscuits of which one pair of opposite sides is much longer than the other and the corrugations extend in a direction perpendicular to the sides of one such pair, the fracture ratio and the local fracture ratio may differ significantly, and it is then preferred that, not only the fracture ratio, but also the local fracture ratio, exceed values referred to herein as being essential to the invention, or as being advantageous or preferred.

As is clear from the definition given above, the determination of the fracture ratio of a biscuit involves subjecting biscuits to two tests and, because each of the tests is destructive, the measurement has to be made on two biscuits, which are implicitly assumed to be identical (at least in respect of their resistance to breaking in the two directions). Under normal commercial manufacturing conditions, assuming that there is no change in the composition of the dough and there are no changes in the other process conditions (and assuming also that the biscuits are commercially acceptable so that, for example, they do not suffer from "checking", which term is explained below), it will usually be found that differences between individual biscuits are small. A representative fracture ratio can then be established by measuring the fracture ratio of several pairs of biscuits, and taking the average of those fracture ratios. Simple statistical analysis will show how many pairs need to be tested but, as a rough guide, five pairs will usually be found to be sufficient, at least when, as is explained hereinbefore, the resistance to breaking of individual biscuits is measured using a separation of 58 mm between the axes of the supporting rollers.

The expression "checking" is used in the art to refer to spontaneous breaking of a biscuit, which can occur when stresses within the biscuit exceed its mechanical strength. Such stresses can arise, for example, if the central portion of the biscuit loses moisture and shrinks, and the outer, rim portion of the biscuit absorbs moisture and expands.

In the discussion that follows, it will be assumed in the interests of simplicity that the biscuits are circular, but the invention is not limited to circular biscuits.

It has been found that the provision of corrugations giving a biscuit a fracture ratio of at least 1.5, and advantageously at least 2.0, improves the consumer's perception of one or more characteristic qualities of the biscuit as compared with a biscuit that is made from a dough of the same composition and has the same thickness, but has planar surfaces. Advantageously, the fracture ratio is at most 4.0, preferably, at most 3.0. Thus, for certain kinds of biscuits, the fat content of the dough, and hence of the biscuit, can be decreased to a level at which, without corrugations, the biscuit would have an undesirably low acceptability to the consumer. The benefits of a biscuit having a corrugated configuration are not, however, limited to that of enhancing the acceptability of a biscuit that would, because of its low fat content, otherwise have an undesirably low acceptability to the consumer. The crunchiness of biscuits that do not have a relatively low fat content is also enhanced because of the corrugations, with a consequent consumer preference for such biscuits, but (as is explained hereinafter) there are constraints on the maximum fat content of a biscuit at which an advantage can be achieved.

A biscuit is to be regarded as "having a corrugated configuration" only if both surfaces are corrugated so that the biscuit, considered as a whole, has a corrugated appearance. Assuming that, as will in practice generally be the case, the two surfaces of the biscuit (or of the dough before baking) have the same periodic corrugated configuration (although, as is explained below, the amplitude of the corrugations in the upper and lower surfaces of the biscuits may differ) then the "wavelength of the corrugations" is to be understood as meaning the separation, in a direction perpendicular to the direction in which the corrugations extend, between adjacent peaks of the corrugations in one surface of the dough or the biscuit. The amplitudes of the corrugations are arrived at by considering the amplitude of the corrugations in each surface of the dough or the biscuit separately.

References to the thickness of corrugated dough or of a corrugated biscuit are to be understood, throughout the specification, as referring to the actual thickness of material measured, not necessarily in a direction perpendicular to the plane of the dough or biscuit as a whole, but rather in a direction perpendicular to an element of area of the dough or biscuit at a particular point. As is explained hereinafter, the thickness as so defined may or may not be uniform over the entire area of the dough or biscuit.

If one takes the resistance to breaking in a direction perpendicular to the direction in which the corrugations extend as providing a primary measure of the resistance to breaking, then the effect of the corrugations is to reduce the resistance to breaking in a direction parallel to the direction in which the corrugations extend, and the magnitude of that reduction determines the fracture ratio. Following that approach, the reduction in that resistance to breaking will be increased if the amplitude of the corrugations is increased. Further, the corrugations will reduce that resistance to breaking not only in that sense, but also absolutely, if the corrugations are such that they lead to the formation of lines (strictly, narrow strips) of reduced thickness of the biscuit.

Generally, the corrugated rollers are also arranged to reduce the piece weight (as hereinafter defined) of the sheet. Preferably, the corrugated rollers are arranged to reduce the piece weight (as hereinafter defined) of the sheet by a factor not exceeding 4.0.

The term "piece weight" is used throughout the specification, including the claims, in relation to a sheet of dough, to mean the weight of a piece of dough removed from the sheet by impressing on the sheet a circular cutter having an internal diameter large by comparison with the wavelength of the corrugations, say, 75 mm, the cutter being so applied to the sheet that it does not extend beyond an edge of the sheet.

It will be appreciated that the piece weight provides a measure of the weight per unit area of the flat sheet and that, if the density of the dough remains constant, the ratio of two piece weights measured at two different parts of the sheet is equal to the ratio of the thicknesses (or, in cases where the thickness is rendered non-uniform by the corrugations, the average thicknesses) of the two different parts of the sheet, provided that allowance is made for the increase in superficial area of the sheet (for a given projected area) that results from corrugation. The fact that, as is well known in the art, when pieces of dough are cut out from the sheet, they undergo a change in shape because of elastic relaxation, is of no significance here because only the weights of the pieces are under consideration.

The corrugated rollers are preferably corrugated by virtue of their having circumferentially extending peaks and troughs, so that they are corrugated in an axial direction.

The fracture ratio of a biscuit made from dough of a given composition and with given baking conditions is determined, at least largely, by the amplitude and wavelength of the corrugations and, usually to a lesser extent, by the thickness of the biscuit. In the interests of simplicity, it will first be assumed that the two corrugated rollers have corrugations of the same configuration and are so arranged that (as is described in more detail hereinafter) the peaks of the corrugations of one roller are opposite to the troughs between adjacent peaks of the corrugations on the other roller.

The profiles of the two corrugated rollers taken in a plane containing the axes of the rollers will define a gap of corrugated configuration between the rollers. That gap is regarded as defining the initial corrugated configuration of the dough. That initial corrugated configuration will be characterized by the amplitude and wavelength of the corrugations, the shape of the corrugations, and the separation between the rollers. The shape of the corrugations can vary widely, for example, the profile of the corrugations may be curved, or be composed of triangular teeth separated by triangular gaps, which can have a wide range of included angles at their apices and which may be truncated (both the teeth and the triangular gaps between them being truncated).

Corrugations composed of triangular teeth having triangular gaps between them (whether truncated or not) are generally preferred to configurations having a curved profile, because a curved profile inevitably causes the initial corrugated configuration of the dough to have a non-uniform thickness.

The separation referred to above between the corrugated rollers is the distance, measured in a direction that is in the plane containing the axes of the rollers and that is perpendicular to those axes, through which distance one of the rollers must be moved (with its axis in that plane) to bring it into contact with the other roller.

As is well known, dough is a visco-elastic material, and it will exhibit some elastic recovery after emerging from between the corrugated rollers. The dough will normally be carried from the corrugated rollers on a conveyor belt and there will be a tendency for the corrugations on the underside of the dough to be slightly flattened (or rounded where the initial corrugated configuration is made up of triangular teeth separated by triangular gaps) under the action of gravity. During the baking process, there will commonly be a greater tendency for the corrugations to be flattened, on both the upper and lower surfaces of the dough, but more markedly on the lower surface.

In deciding on the configuration of the corrugated rollers, it must be remembered that the fracture ratio of the biscuits is related directly to the configuration of the biscuits themselves, and only indirectly to the initial corrugated configuration of the dough. Thus, account has to be taken of the extent to which the initial corrugated configuration of the dough is retained in the final biscuit. As is explained in detail below, the extent to which the initial configuration is retained is conveniently specified by the "corrugation retention index", which takes the form x/y, where x is a measure of the retention (expresssed as a percentage) of the corrugations in the upper surface, and y is a corresponding measure of the retention (again expressed as a percentage) of the corrugations in the lower surface.

A corrugation retention index 100/100 means that the corrugations in both the upper and lower surfaces of the biscuits show no flattening (or rounding) as compared with the initial corrugated configuration imparted to the dough. A corrugation retention index $x_1/y_1$ is regarded as being higher than a corrugation retention index $x_2/y_2$ provided that $x_1 \geq x_2$, $y_1 \geq y_2$, and at least one of the relations $x_1 > y_1$ and $x_2 > y_2$ is true.

In practice, if the corrugation retention index is 90/80 or higher, the biscuits show no substantial loss of corrugation as compared with the initial corrugated configuration imparted to the dough. At the other extreme, it will usually be found that a corrugation retention index of below 60/50 is unacceptable, partly because the effective amplitude of the corrugations—strictly, the amplitude of the corrugations will not be well-defined—of the biscuits will be too small to give an adequate fracture ratio, and partly because the biscuits will not have a pleasing appearance. Advantageously, the corrugation retention index is at least 70/60.

For a dough of a given composition and with given baking conditions, the corrugation retention index will depend on the initial corrugated configuration. Considering first the case where the profile of the corrugations is in the form of triangular teeth, it is clear that smaller included angles at the apices of the teeth will result in corrugations that are narrow for a given height and so are liable to deformation. If the amplitude of the corrugations is A and their wavelength is W, then the included angle, $\Theta$, is given by:

$$\Theta = 2\tan^{-1}(W/4A).$$

Thus, for for various values of the A/W ratio, that is to say, for various values of A/W, we have:

| | |
|---|---|
| A/W = 1, | $\theta$ = 28° |
| A/W = 0.5, | $\theta$ = 53° |
| A/W = 0.25, | $\theta$ = 90° |

Where it is desired that at least the upper corrugations have a relatively high A/W ratio which, if used for the lower corrugations, would tend to give a low corrugation retention index, the lower corrugations may, in principle, be of smaller amplitude than the upper ones so that, the wavelength being the same in each case, the lower corrugations have a lower A/W ratio and a correspondingly reduced tendency to distort. Where the upper corrugations are, seen in profile, in the form of triangular teeth, a similar effect may be achieved by arranging that the lower corrugations have a different profile. For example, the lower corrugations might be in the form of teeth that, if triangular, would have a larger amplitude than the upper corrugations, but which are so truncated that the two amplitudes are the same. It should be noted, however, that where the upper and lower corrugations of the initial configuration of the dough differ from each other, the thickness of the biscuit will not be uniform, and may not even be well-defined.

A further disadvantage associated with the use of small included angles (but one which can be lessened by truncation) is difficulty in getting the dough to leave the corrugated rollers cleanly, rather than tending to adhere to them.

The wavelength of the corrugations is significant in two respects. First, it should be chosen to give a reasonable number of corrugations in a single biscuit. That number can vary widely, but it will not usually be less than five, and it will usually be found that a number between, say, eight and fifteen is satisfactory. Second, the wavelength is significant because, as is explained above, the ratio of the amplitude to the wavelength of the corrugations affects the corrugation retention index.

Advantageously, the initial corrugated configuration of the dough has corrugations that are substantially uniform and have a wavelength within the range of from 2 to 10 mm.

The amplitudes of the corrugations of the two surfaces that bound the initial corrugated configuration of the dough are advantageously the same and within the range of from 0.5 to 4 mm (preferably, from 1 to 3 mm). Further, the amplitude of the corrugations of those two bounding surfaces is advantageously within the range of from 0.25 to 2.5 times the thickness of the initial corrugated configuration of the dough.

With a toothed profile, the teeth are advantageously each symmetrical about a plane that extends perpendicular to the axis of the corrugated roller and passes through the apex of the tooth. Then, the two corrugated rollers may be so located relative to one another in an axial direction that the apices of the teeth that form the said profile of one corrugated roller lie in planes that are perpendicular to the axes of the two corrugated rollers and that are midway between planes parallel to those planes and passing through the apices of the teeth that form the said profile of the other corrugated roller. With such an arrangement, the corrugations do not cause the thickness of the initial corrugated configuration of the dough to be non-uniform. Instead, the two corrugated rollers may be so located relative to one another in an axial direction that the apices of the teeth that form the said profile of one corrugated roller lie in planes that are perpendicular to the axes of the two corrugated rollers and that are between, but depart from being midway between, planes parallel to those planes and passing through the apices of the teeth that form the said profile of the other corrugated roller, preferably, by a distance within the range of from 0.15 to 0.40 times the thickness of the initial corrugated configuration and preferably not exceeding 0.25 times the wavelength of the corrugations. With that arrangement, the corrugations result in the initial corrugated configuration of the dough having a non-uniform thickness, one part of each corrugation having a thickness greater than that of the other part.

The teeth that form the said profile may each be asymmetrical about a plane that extends perpendicular to the axis of the corrugated roller and passes through the apex of the tooth, when the thickness of the initial corrugated configuration is again non-uniform.

Although arranging that the initial corrugated configuration of the dough is of non-uniform thickness, as described above, tends to increase the fracture ratio, it reduces the mechanical strength of the biscuits, with a consequent increased risk of breakage before they reach the consumer.

Although the corrugation retention index is dependent, as explained above, on the initial corrugated configuration of the dough, it is more dependent on the composition of the dough, and it is that factor that prevents the invention from being used for producing biscuits from doughs having a very high fat content. The effect of the composition of the dough, on the corrugation retention index and otherwise, is discussed below.

With biscuits having corrugations of a given amplitude and wavelength, and having a given thickness, the fracture ratio is generally found to decrease as the fat content of the biscuit is increased (assuming the composition of the biscuit, including the sugar content, is otherwise unchanged). Also, the fracture ratio is generally found to decrease as the sugar content of the biscuit is increased (again assuming that the composition of the biscuits, including the fat content, is otherwise unchanged). The rate of decrease in the fracture ratio as the sugar content is increased is greater than the rate of decrease as the fat content is increased. The reason for the decrease in fracture ratio is thought to be because, as the fat and/or the sugar contents (especially the sugar content) are increased, so the dough tends to flow more during baking, leading to a decrease in the corrugation retention index as discussed above.

Accordingly, while a corrugated biscuit with a fracture ratio greater than 1.5 can be obtained when the fat content of the dough from which the biscuit is made is up to 25% by weight based on the weight of the dough (or the fat content of the biscuit is up to 30% by weight based on the weight of the biscuit), the fat content of the dough advantageously does not exceed 20% by weight based on the weight of the dough (or the fat content of the biscuit advantageously does not exceed 25% by weight based on the weight of the biscuit), and preferably does not exceed 15% by weight based on the weight of the dough.

Similarly, while a corrugated biscuit with a fracture ratio greater than 1.5 can be obtained when the sugar content of the dough from which the biscuit is made is up to 20% by weight based on the weight of the dough, the sugar content of the dough advantageously does not exceed 18%, preferably, 15%, by weight based on the weight of the dough. The upper limit for the sugar content will depend partly on the physical form and molecular structure of the sugar when it is incorporated with the other ingredients of the dough. For example, all the sugar may be in solid, particulate form, or part of the sugar may be in the form of a syrup. The term "sugar" is used throughout the specification to mean a mono- or disaccharide that has sweetening properties, or any suitable source of such a mono- or disaccharide.

Such suitable sources include, for example, sucrose, glucose, fructose and mixtures of monosaccharides and/or disaccharides, for example, invert sugar, honey and molasses.

As explained above, because increasing the fat content and increasing the sugar content each causes the fracture ratio to decrease, when the fat content of a dough is relatively high, that is to say, at least 15% by weight based on the weight of the dough, then the sugar content advantageously does not exceed 15% by weight based on the weight of the dough. Similarly, when it is desired to make a sweet biscuit having a sugar content of at least 15% by weight based on the weight of the dough, then advantageously the fat content does not exceed 12% by weight based on the weight of the dough. The maximum preferred fat and sugar contents in any particular case also depend to a certain extent on the manner in which the biscuit is made, especially, the mixing sequence of the constituents of the dough, and on the other constituents of the dough. Thus, for example, it may be found that the sodium bicarbonate content of the dough should not exceed 1% by weight and based on the weight on the dough, because (as is known to those skilled in the art) at higher levels the dough has an increased tendency to flow. Thus, with more than 1% of sodium bicarbonate by weight and based on the weight of the dough it may be found difficult to produce biscuits having corrugations sufficient to give a fracture ratio in accordance with the invention.

The fat content of the dough may be less than 7.5% by weight based on the weight of the dough, but in that case the corrugated configuration of the biscuit is advantageously such that the fracture ratio is at least 2.0 and, preferably, at least 3.0. Biscuits known as "crackers" or "water biscuits", are generally made from a dough having a fat content of less then 7.5% by weight based on the weight of the dough (and may in some cases be made from a dough containing no fat), and no sugar. Such biscuits, which are not in accordance with the invention, are made up of very thin layers of biscuit material separated by voids. In contrast to that, the present invention enables biscuits having a thickness (as explained hereinbefore) of at least 1.5 mm, advantageously at least 2.0 mm (but advantageously not more than 5.0 mm, and preferably not more than 3.0 mm) to be made from a dough containing not more than 7.5% by weight of fat based on the weight of the dough.

Sweet or semi-sweet biscuits, that is to say, biscuits made from dough having a total sugar content of at least 10%, often at least 12.5%, by weight and based on the weight of the dough, may, in accordance with the invention, be made from a dough having a fat content not exceeding 20% (preferably 15%) and not have an undesirably low acceptability to the consumer despite the thickness of the biscuit being at least 2 mm, and perhaps at least 3 mm.

The fat content of the biscuit, expressed as a percentage by weight and based on the weight of the biscuit, can be inferred reasonably accurately from the fat content of the dough. That is because essentially the only component of the dough that is lost during baking is water, and the water content of biscuits is almost always within the range of from 1 to 3% by weight and based on the weight of the biscuit.

The biscuits of the invention may be made from doughs that include additional food items, for example, currants, nuts, herbs or so-called "chocolate chips", that are admixed with the dough prior to corrugation (such items, which remain distinct items as opposed to being diffused through the dough, being hereinafter referred to as "inclusions"). Inclusions are not to be regarded as affecting the composition of the dough, all references to the composition of the dough being to that of the dough without the inclusions. The addition of inclusions will generally be found to decrease the fracture ratio of the biscuit.

After baking, the biscuits of the invention may be treated by the addition of one or more substances to their outer surfaces. For example, a biscuit may have its outer surface sprayed with oil, dusted with sugar, or have the whole or part of its surface coated with chocolate or icing. In another arrangement, one or more of a variety of flavoured pastes (including chocolate and jam) may be applied in a pattern to one or both corrugated surfaces of the biscuits after baking to give the biscuits a decorative appearance. For example, one or more such pastes may be applied so as to lie in strands extending across the corrugations on one surface of each of the biscuits. Alternatively, one or more such pastes may be applied to one corrugated surface of each of the biscuits so as to lie in strips extending in the same direction as the corrugations, the strips either covering the peaks of the corrugations (but not extending to the bases of the troughs between them), or extending along the bases of the troughs without covering the peaks. The strips on a biscuit may all be of paste of the same composition, or a variety of pastes of different colours may be applied in a repeating sequence of different coloured strips. References to the fat and sugar content of a biscuit are to be understood as excluding any fat and sugar contents that derive from such additions to the biscuits after baking. Similarly, the fracture ratio of such a biscuit is that of the biscuit without such additions to its outer surface.

The biscuit may also be made from a plurality of (for example, two or three) sheets of dough (which sheets may have different compositions) which are fed, one on top of another, to the corrugated rollers, where the sheets are laminated to form a single, layered, corrugated sheet. The compositions of the doughs may be such that the finished biscuit has layers of different colours. Whereas delamination of the layers commonly occurs with biscuits that have Planar surfaces and are made from a plurality of sheets of dough, it has been found that very little delamination (if any) occurs when the biscuits have a corrugated configuration in accordance with the invention. Inclusions, as mentioned above, may be placed between the sheets of dough, or a layer of a flavoured paste may be spread on one of the sheets and another sheet placed on top of it, before the sheets of dough are fed to the corrugated rollers.

Where different doughs are used to form a single biscuit, references to the fat content and sugar content of the corrugated dough are to be understood to refer to the (weighted) average of those quantities for the individual doughs, and exclude the fat content and sugar content of any inclusions but do not exclude the fat and sugar content of any layer of flavoured paste between layers of dough as referred to above.

The biscuits of the invention may form components of composite biscuits, for example, so-called "sandwich" biscuits made up of two or more individual biscuits separated by a layer or layers of filling material. The filling may be, for example, a cream, chocolate or fruit paste.

BRIEF DESCRIPTION OF THE DRAWINGS

A process for the production of corrugated biscuits, several modifications of that process, and several forms of corrugated biscuit, all in accordance with the invention, will now be described, by way of example, with reference to the accompanying drawings, in which:

FIGS. 24 and 25 are enlarged cross-sections of two different biscuits, each having two layers of dough and a layer of flavoured paste between the layers of dough;

Referring to FIG. 1 of the accompanying drawings, in the process of the invention, dough 1 formed in a mixer (not shown) is introduced into a funnel 2a of a three-roll sheeter, indicated generally by the reference numeral 2, comprising three rolls 2b arranged to form the dough 1 into a flat sheet 1a, which emerges from the base of the sheeter 2. From there, the flat sheet 1a is fed by a conveyor (not shown) to three pairs of gauge rollers 3, 4, and 5, respectively, which progressively reduce the thickness of the sheet 1a. From the last pair of gauge rollers 5, the flat sheet 1a of dough 1 is fed to a pair of corrugated rollers, indicated generally by the reference numeral 6. As shown in FIGS. 2 and 3, the corrugated rollers 6 comprise an upper roller, indicated generally by the reference numeral 6a, and a lower roller, which is indicated generally by the reference numeral 6b. The rollers 6a and 6b are corrugated axially, that is to say, the curved surface of each roller is formed with corrugations that extend circumferentially, the corrugations being indicated generally by the reference numeral 7, and having individual peaks 7a and troughs 7b extending circumferentially. The configuration of the corrugated rollers 6a and 6b will be described in greater detail below.

Figure 4:
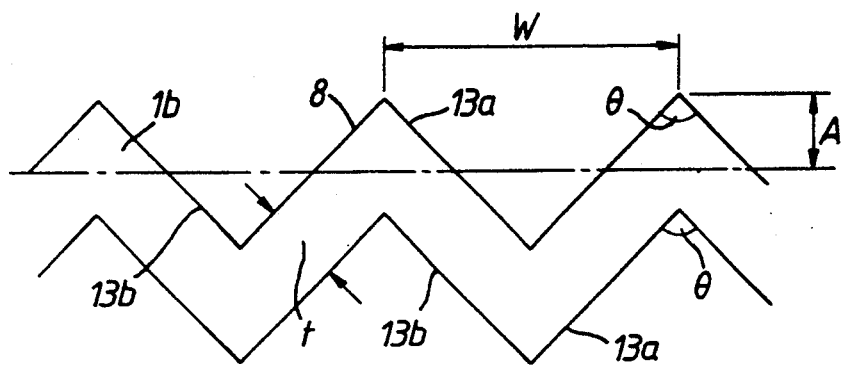
FIG. 4 is a cross-section on a larger scale than FIG. 3 taken through a first form of a corrugated sheet of dough in its initial corrugated configuration.

The flat sheet 1a fed to the corrugated rollers 6 has corrugations 8 imparted to it by the rollers 6 and emerges from them as a corrugated sheet 1b, which is shown, in its initial corrugated configuration, in FIG. 4. The individual corrugations 8 extend longitudinally, that is to say, in the direction of advance of the sheet, so that the sheet is corrugated transversely. The corrugated rollers 6 serve not only to impart the corrugations 8 to the sheet, but also to reduce the thickness of the sheet.

The corrugated sheet 1b of dough that emerges from the rollers 6 is then fed between a cutter roller 9 and a support roller 10, to cut out from the corrugated sheet individual, generally laminar corrugated portions of dough of the shape and size required for the biscuits. Those portions of dough 1 are conveyed to an oven (not shown), in which they are baked to form biscuits.

Figure 2:
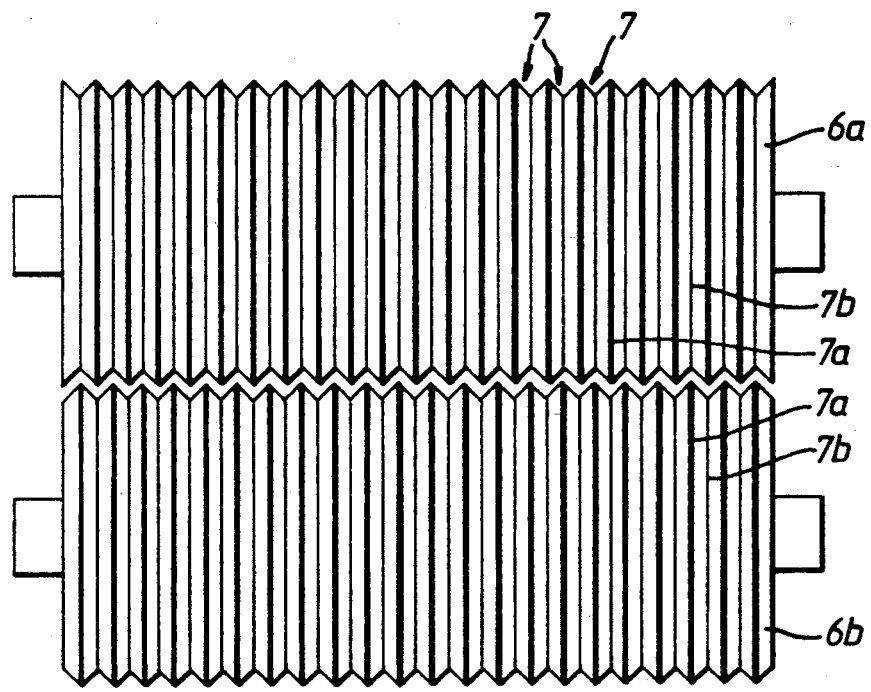
FIG. 2 is a view, on a larger scale than FIG. 1, of a pair of corrugated rollers that form part of the apparatus shown in FIG. 1, the view being in the direction in which the sheet of dough travels to the rollers.
Figure 3:
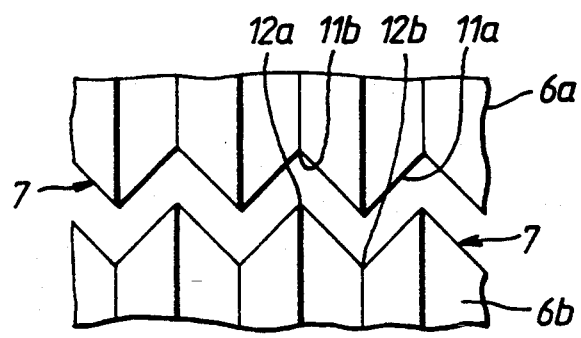
FIG. 3 is a view of a portion of the corrugated rollers of FIG. 2, on a larger scale than FIG. 2.

Referring now to FIGS. 2 and 3, the shape of the peaks 7a and troughs 7b of the corrugations on each of the curved surfaces of the rollers 6a and 6b is such that, in axial section, each of the rollers has a toothed profile with triangular teeth 11a, 12a, respectively, and triangular gaps 11b, 12b, respectively, between the teeth. The teeth 11a, 12a are bounded by straight lines which meet at an angle of 90° at the apices of the teeth. Similarly, the lines that bound the gaps 11b, 12b meet at an angle of 90° at the bases of the gaps between adjacent teeth 11a, 12a.

The rollers 6a and 6b are so corrugated that the peaks 7a of one roller are displaced axially relative to the peaks 7a of the other roller by half the wavelength of the corrugations, that is to say, by half of the separation between the apices of adjacent teeth 11a, 12a. Thus, the apices of each of the teeth 11a on the roller 6a lie midway between the apices of the teeth 12a of a pair of adjacent teeth on the roller 6b. Similarly, the apices of each of the teeth 12a on the rollers 6b lie mid-way between the apices of the teeth 11a of a pair of adjacent teeth on the roller 6a.

FIG. 4 shows the initial corrugated configuration (as explained above) of the sheet 1b of dough. In other words, the configuration shown in FIG. 4 is the configuration of the gap between the rollers 6a and 6b. Thus, the upper and lower surfaces of the initial corrugated configuration of the sheet 1b also have toothed profiles with teeth 13a having an angle Θ of 90° at their apices (the same as that of the gaps 11b, 12b of the rollers 6a and 6b). The bases of gaps 13b between the teeth 13a meet at the same angle Θ of 90° as the apices of the teeth 11a and 12a of the rollers 6a, 6b. The corrugations 8 on the upper and lower surfaces of the sheet 1b have a wavelength W and amplitude A (again both equal to those of the corrugations 7 of the rollers 6a and 6b). The thickness of the sheet 1b at any particular point is measured in a direction perpendicular to an area of the sheet at that point.

Figure 1:
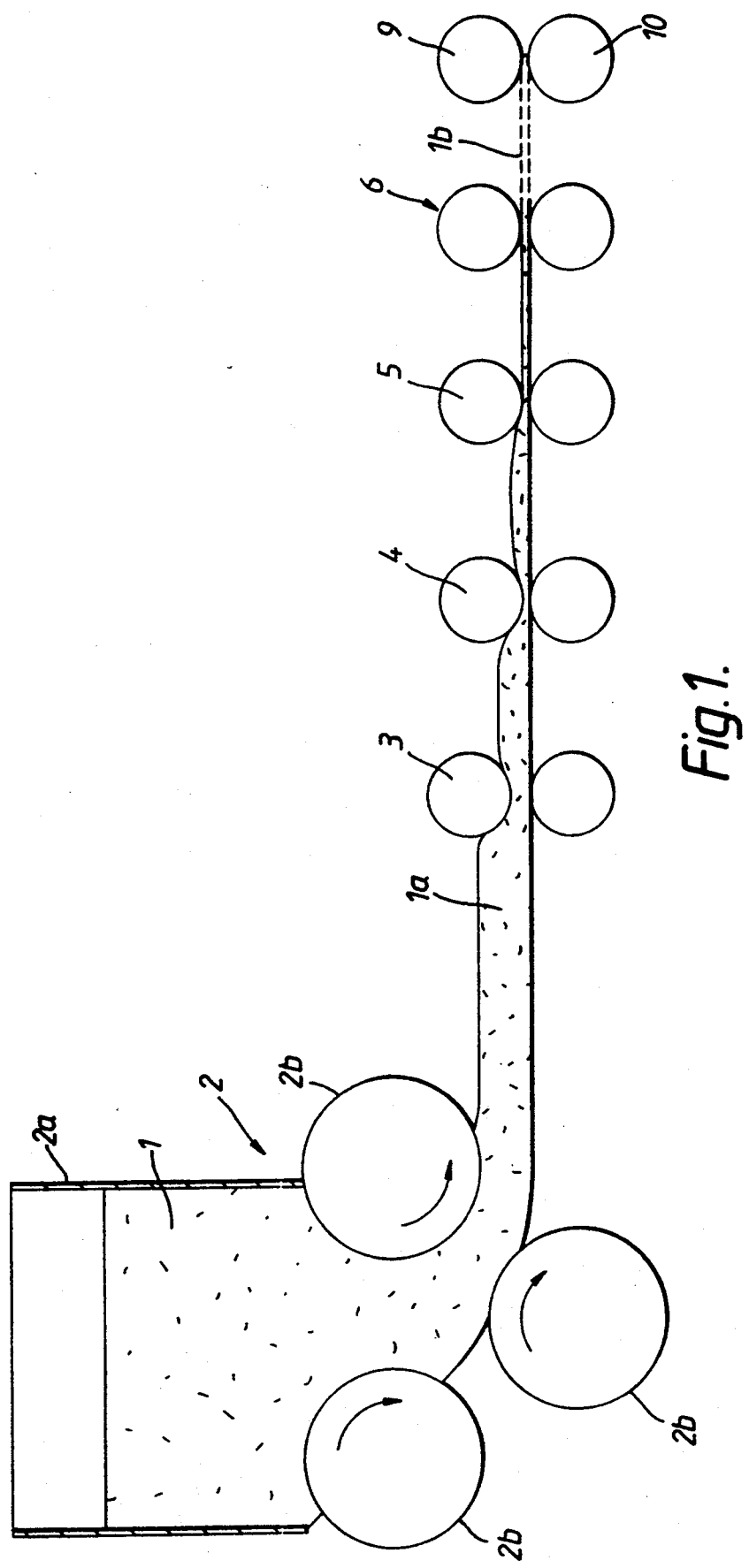
FIG. 1 is a diagrammatic side view of apparatus for forming dough into a sheet having a corrugated configuration and cutting out generally laminar portions from the sheet.

As an example of suitable dimensions for the apparatus of FIG. 1, the gap between the two rolls of the three-roll sheeter 2, from which the sheet of dough emerges, may be 9 mm, the gap between the gauge rollers 3 may be 5 mm, the gap between the gauge rollers 4 may be 3 mm, and the gap between the gauge rollers 5 may be 1 mm.

The separation between the corrugated rollers 6 (the radial distance between the apex of one tooth 11a on one roller 6a and the base of the corresponding gap 12b between adjacent teeth 12a on the other roller 6b) may be 0.9 mm. The wavelength W of the corrugations 7 on each of the rollers 6a and 6b may be 4 mm, when the amplitude A will be W/4 (given that $\Theta = 900°$).

In a modification of the process, the corrugated rollers used each have the same profile as the rollers 6a and 6b, but the corrugations of one roller are displaced axially with respect to those of the other from the positions shown in FIGS. 2 and 3 by a distance not exceeding a quarter of a wavelength (W/4). Such corrugated rollers are not shown, but the initial corrugated configuration of the resulting sheet of dough 1c is shown in FIG. 5.

Figure 5:
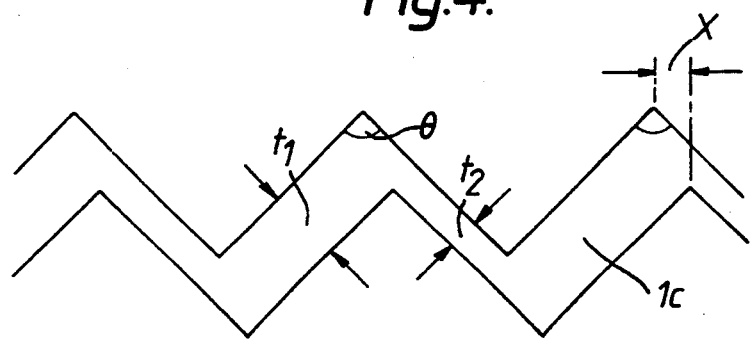
FIG. 5 is a cross-section on the same scale as FIG. 4 taken through a second form of a corrugated sheet of dough in its initial corrugated configuration.

As can be seen from FIG. 5, the thickness $t_1$ of the sheet 1c over one part of each corrugation is greater than the thickness $t_2$ of the sheet over the other part of the corrugation. Given that $\Theta = 90°$ (see FIG. 4), and assuming that the axial displacement is $\sqrt{X}/2$ (where $X \leq W/4$) and that the separation between the corrugated rollers 6a and 6b remains unchanged, then $t_1 = t + X/2$ and $t_2 = t - X/2$.

Figure 6A:
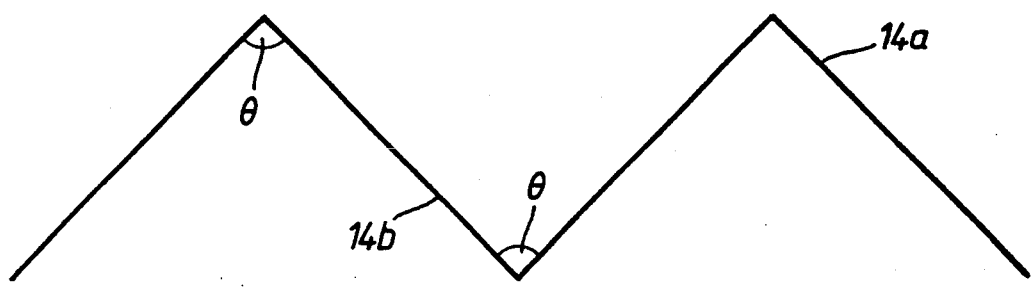
FIGS. 6a, 6b, 6c and 6d show diagrammatically portions of different profiles for the corrugated rollers.
Figure 6B:
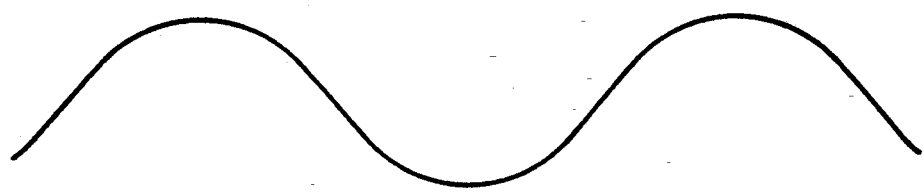
Figure 6C:
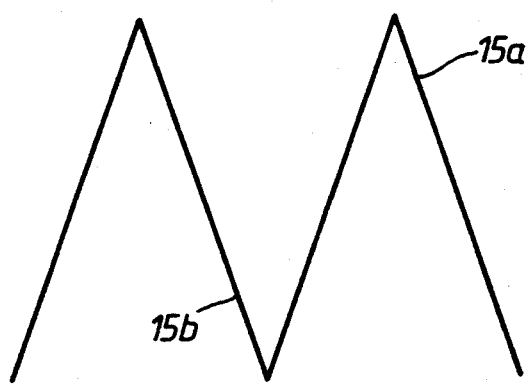
Figure 6D:
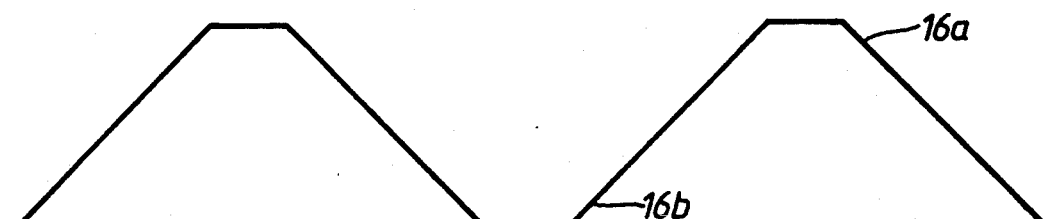

FIGS. 6a to 6d show, diagrammatically, different profiles for the corrugated rollers, and hence different initial corrugated configurations for the corrugated sheet of dough. Thus, FIG. 6a shows a toothed profile with teeth 14a each having an angle of 90° at its apex, the bases of gaps 14b between the teeth 14a also meeting at angles of 90°. That profile is similar to the profiles of the rollers 6a and 6b shown in FIGS. 2 and 3. FIG. 6b shows a curved profile which results in a corrugated sheet of dough having rounded peaks and troughs. In the profile shown in FIG. 6c, teeth 15a are much more pointed than those of the profile shown in FIG. 6a, the angles subtended at the a apices of the teeth 15a and the bases of gaps 15b between them being considerably smaller than 90°. In FIG. 6d, both teeth 16a and gaps 16b between the teeth are truncated.

FIGS. 8a, 8b to 12a, 12b, inclusive are views of dough having different initial corrugated configurations shown as circular pieces of dough, and ignoring any recovery or relaxation of the dough). The corrugations are the same on both surfaces, and are as given in the table below, where A is the amplitude of the corrugations, W is the wavelength, $\Theta$ the included angle at the apex of each of the teeth and at the base of each of the gaps between the teeth, and t is the thickness of the

Figure 8A:
FIGS. 8a and 8b are a cross-section and a plan view, respectively, of a piece from a third form of a sheet of dough in its initial corrugated configuration.
Figure 8B:
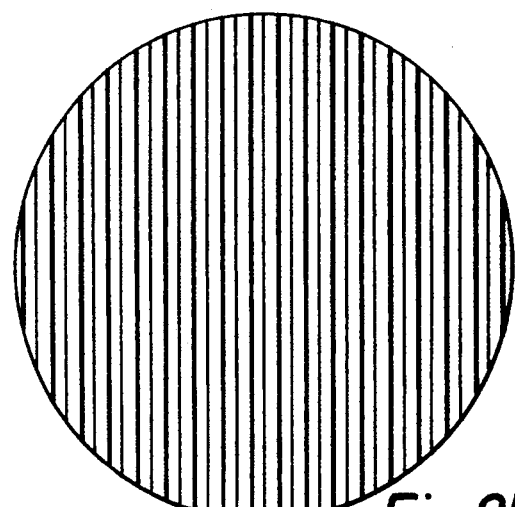
Figure 9A:
FIGS. 9a and 9b are a cross-section and a plan view, respectively, of a piece from a fourth form of a sheet of dough in its initial corrugated configuration.
Figure 9B:
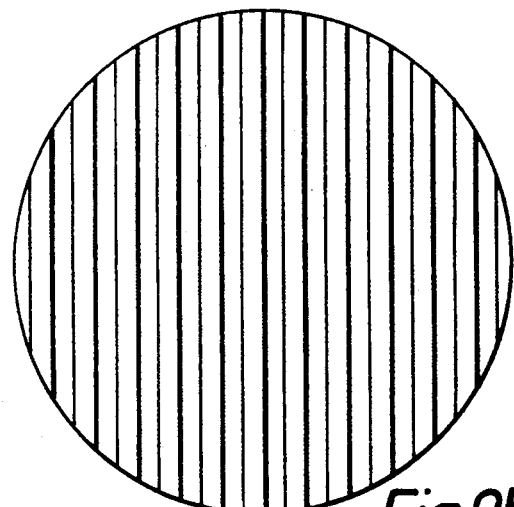
Figure 10A:
FIGS. 10a and 10b are a cross-section and a plan view, respectively, of a piece from a fifth form of a sheet of dough in its initial corrugated configuration.
Figure 10B:
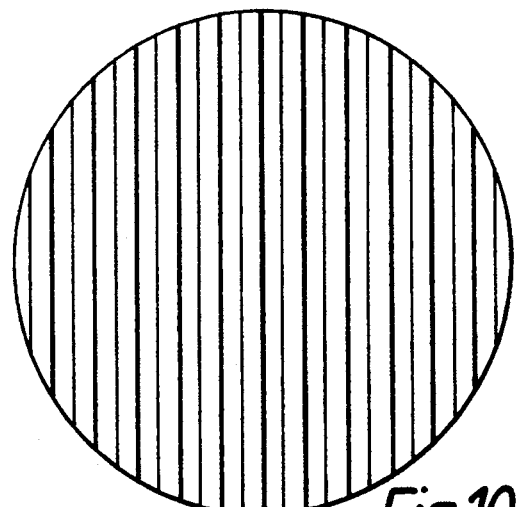
Figure 11A:
FIGS. 11a and 11b are a cross-section and a plan view, respectively, of a piece from a sixth form of a sheet of dough in its initial corrugated configuration.
Figure 11A:
Figure 11B:
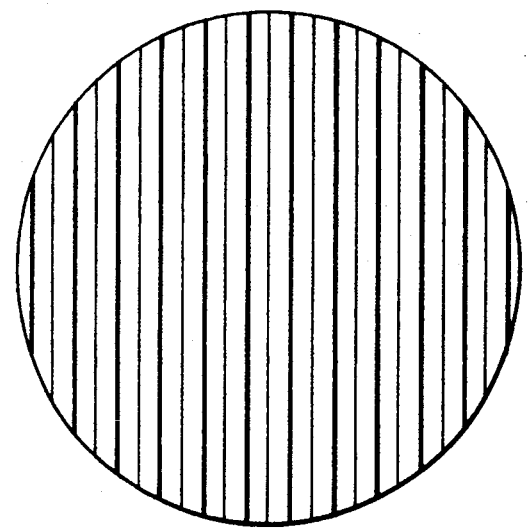
Figure 12A:
FIGS. 12a and 12b are a cross-section and a plan view, respectively, of a piece from a seventh form of a sheet of dough in its initial corrugated configuration.
Figure 12B:
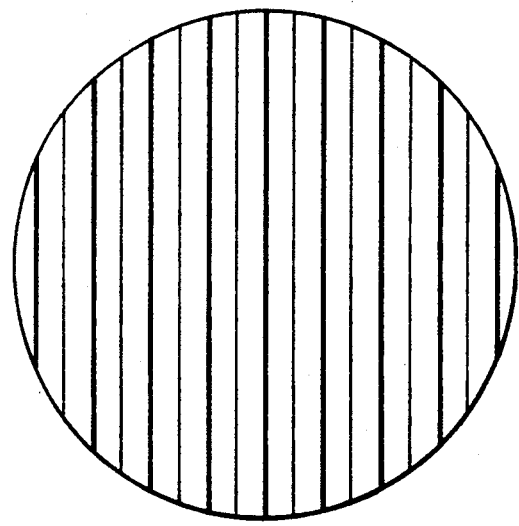
Figure 13:
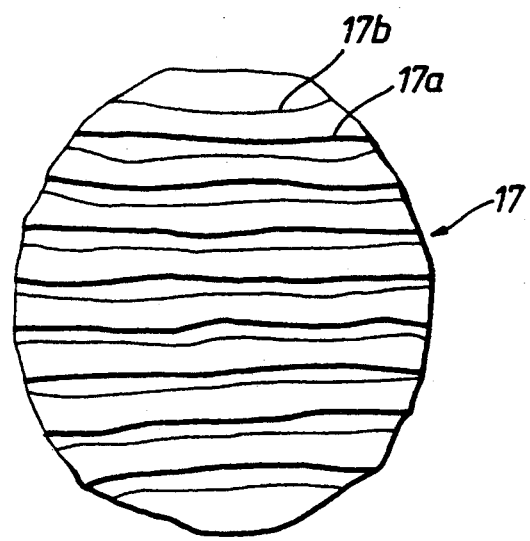
FIGS. 13 to 19, inclusive, are plan views of different forms of biscuit made in accordance with the invention.

| Biscuit shown in: | A(mm) | W(mm) | A/W | $\theta$ | t(mm) |
|---|---|---|---|---|---|
| FIGS. 8a, 8b | 1 | 4 | 0.25 | 90° | 2 |
| FIGS. 9a, 9b | 1.5 | 6 | 0.25 | 90° | 3 |
| FIGS. 10a, 10b | 2.25 | 6 | 0.375 | 67° | 4.5 |
| FIGS. 11a, 11b | 3 | 6 | 0.5 | 53° | 6 |
| FIGS. 12a, 12b | 2 | 8 | 0.25 | 90° | 4 |

Although the shape of the pieces of dough shown in FIGS. 8b, 9b, 10b, 11b and 12b are shown as exactly circular, relaxation of the dough will cause some distortion of that shape after cutting, especially during baking. Thus, as is known, if circular biscuits are required, the shape of the pieces of dough cut from the corrugated sheet must allow for that distortion. Accordingly, the shape of pieces of dough cut from the corrugated sheet needed to form circular biscuits will be generally slightly oval or elliptical. Some distortion of the corrugations of the pieces of dough can also occur because the relaxation of the dough is more pronounced towards the perimeter of the pieces.

As the corrugated sheet of dough is transported for cutting into pieces as described above with reference to FIG. 1, and as the corrugated pieces of dough are carried to the oven, there will be a tendency for the corrugations on the underside of the dough to be slightly flattened under the action of gravity (the dough being generally transported on a conveyor belt). During the baking process there is also likely to be a greater degree of flattening of the corrugations on both the upper and lower surfaces of the dough, but more especially on the lower surface. As explained above, the degree of flattening in any particular case, which will depend on the configuration of the corrugations and the composition of the dough, can be expressed in terms of a "corrugation retention index".

Figure 7A:
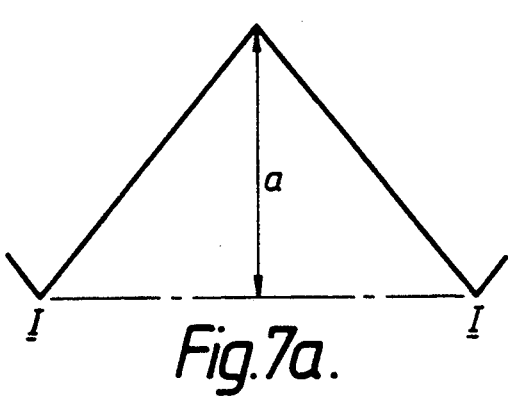
FIGS. 7a, 7b, 7c and 7d are diagrams illustrating measurement of the corrugation retention index of a biscuit in accordance with the invention.
Figure 7B:
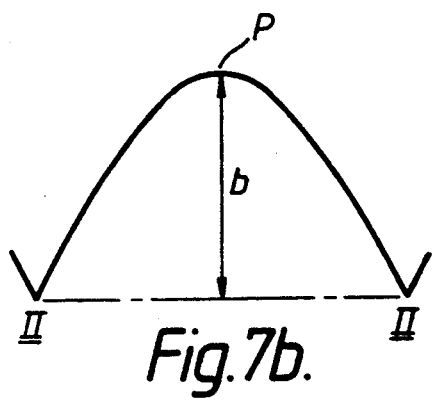

The method of measuring the corrugation retention index of a biscuit will now be explained with reference to FIGS. 7a to 7d. In FIG. 7a, the height of a single corrugation of the upper side of a piece of dough in its initial corrugated configuration is shown as "a" (so that "a" is twice the amplitude of the upper corrugations or, for those corrugations, a=2A). In order to determine the corrugation retention index, a length "b" corresponding to "a" has to be determined for the same corrugation on the upper side of that piece of dough after baking to form a biscuit. The distance "b" is shown in FIG. 7b, and it will be seen that it is the distance of the highest point p of the corrugation from a line II—II joining the lowest points of the troughs on either side of the corrugation. It can be seen by comparing FIGS. 7a and 7b that the corrugation has been flattened to a certain extent, or become rounded.

Figure 7C:
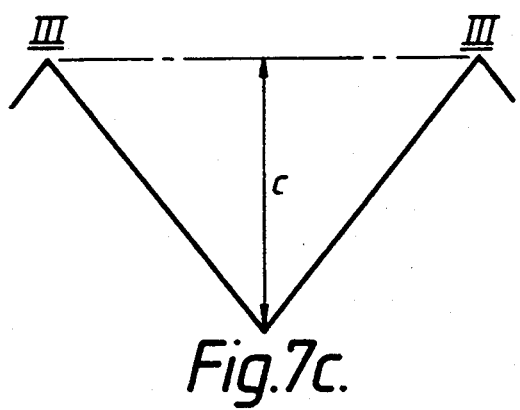
Figure 7D:
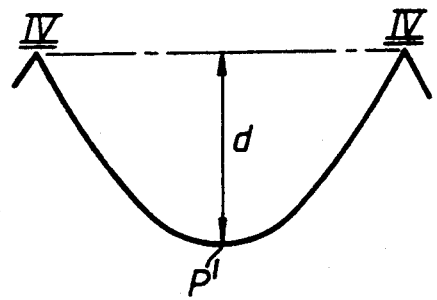

In FIG. 7c, the height of a single corrugation of the lower side of the piece of the dough in its intital corrugated configuration is shown as "c" (so that, for the lower corrugations, c=2A). Where the upper and lower corrugated rollers have the same configuration, which is the preferred case, and the case shown in FIGS. 7a and 7c, then a=c, but the general case is discussed. In FIG. 7d, there is shown the same corrugation as shown in FIG. 7c, but after baking to form a biscuit, a greater degree of flattening occurring than in the case of the corrugation of FIGS. 7a and 7b on the upper surface of the dough. In FIG. 7d, a distance "d", corresponds to the distance "b" shown in FIG. 7b.

Thus, "d" is the distance separating the point p', which would be the highest point of the corrugation if the biscuit were to be inverted, from a line IV—IV joining the bases of the troughs on either side of the corrugation.

The distances "a" and "c" are determined by the configuration of the corrugated rollers 6a and 6b, but the distances "b" and "d" have to be measured. It is recommended that a biscuit be severed, in the plane of the biscuit and along the centre line perpendicular to the direction in which the corrugations extend, and then photographed to give a print on an enlarged scale. The measurement of "b" for each upper corrugation and of "d" for each lower corrugation can then be measured on the print, and corrected for the degree of enlargement. Whether the values of "b" and "d" are obtained in that way or otherwise, the values of "b" are averaged to give a mean value b, and the values of "d" are averaged to give a mean value d.

The corrugation retention index is then defined to be x/y, where $$x = 100b/a, \text{ and } y = 100d/c.$$

Referring now to FIGS. 13 to 27, FIG. 13 shows a corrugated biscuit indicated generally by the reference numeral 17, having peaks 17a and troughs 17b on its upper surface. The biscuit 17 was formed by baking a piece cut from a corrugated sheet of dough similar to that shown in FIGS. 11a and 11b, the corrugated dough having been produced using corrugated rollers having an amplitude A of 3 mm and a wavelength W of 6 mm. Distortion of the peaks 17a and the troughs 17b (so that they are not straight as seen in plan) due to relaxation of the dough (as distinct from imperfect corrugation retention) can be seen in the biscuit 17 as compared to their original configuration as shown in FIG. 11b.

Figure 14:
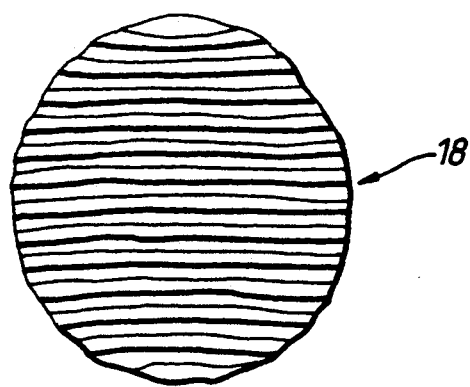

FIG. 14 shows a corrugated biscuit 18 formed by baking a portion cut from a corrugated sheet of dough similar to that shown in FIGS. 8a and 8b and made using corrugated rollers having an amplitude A of 1 mm and a wavelength W of 4 mm. Some distortion of the corrugations in the biscuit 18 is again evident.

Figure 15:
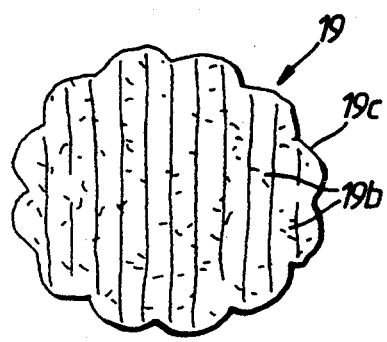

FIG. 15 shows a corrugated biscuit, indicated generally by the reference numeral 19, made using corrugated rollers having an amplitude A of 1 mm and a wavelength W of 4 mm. The biscuit 19 has a fluted edge 19c and is made of a dough to which herbs 19b have been added, the herbs being "inclusions" as referred to above. After baking of the dough, the biscuit 19 is sprayed on its outer surface with oil (not shown).

Figure 16:
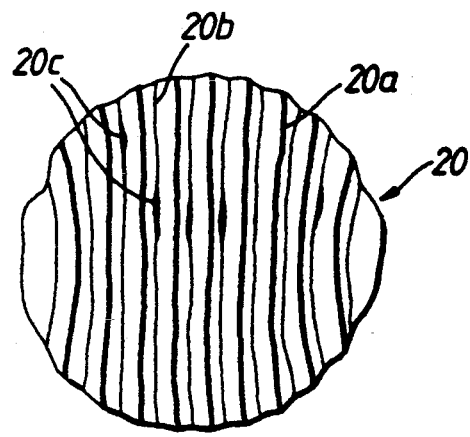

A biscuit 20 having peaks 20a and troughs 20b, as shown in FIG. 16, contains inclusions in the form of sultanas, small portions 20c of which can be seen exposed at the surfaces of the troughs 20b.

Figure 17:
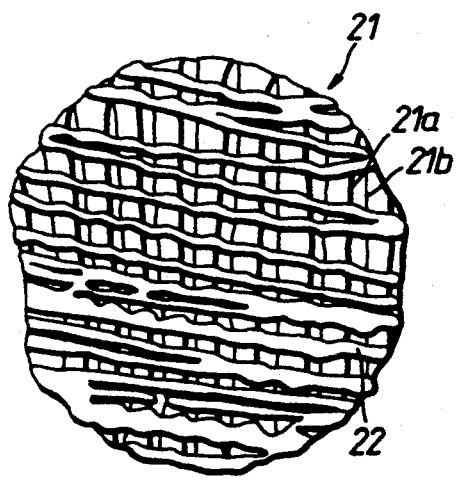

In FIG. 17 is shown a biscuit 21 having peaks 21a and troughs 21b. Chocolate has been piped or extruded so as to lie in strands 22 across the corrugations on the upper surface.

Figure 18:
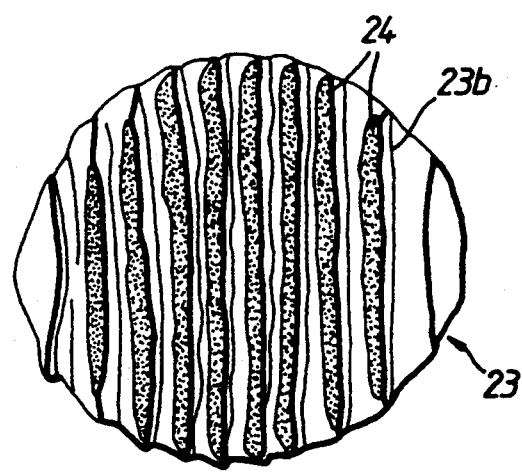

FIG. 18 shows a corrugated biscuit 23 which has strips 24 of chocolate piped along its peaks so as to cover the peaks but not extend to the bases of the troughs 23b between them. A cross-section through a similar biscuit is shown on a larger scale in FIG. 20 in which, for ease of reference, the same reference numerals are used.

Figure 19:
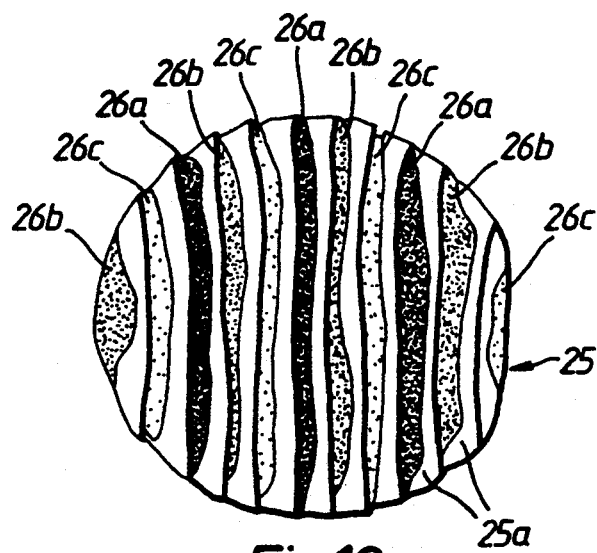
Figure 20:
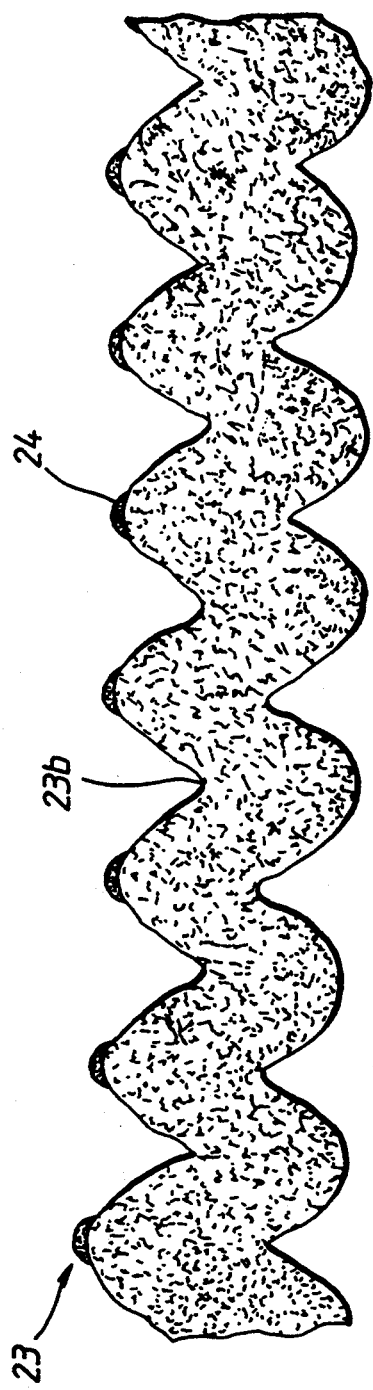
FIGS. 20 and 21 are enlarged cross-sections of biscuits similar to the biscuits shown in FIGS. 18 and 19, respectively.
Figure 21:
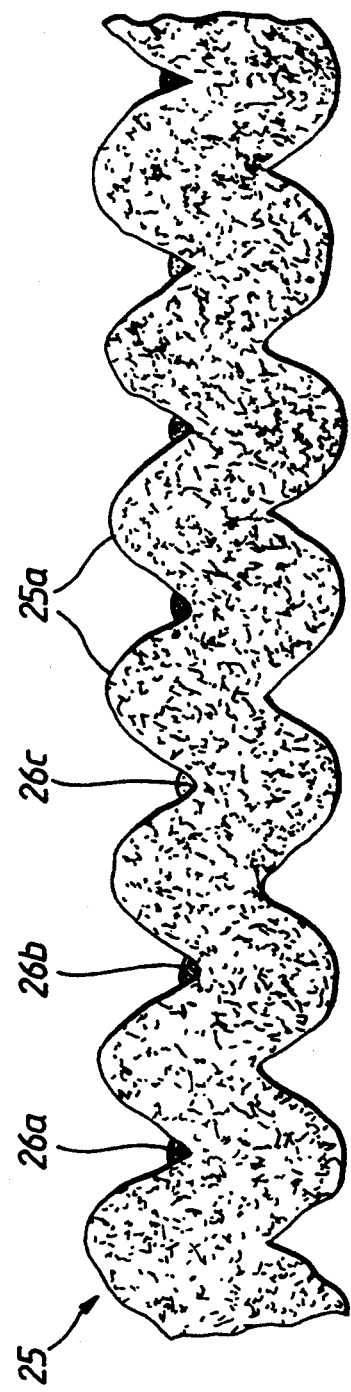

In FIG. 19, a corrugated biscuit 25 has alternate strips of strawberry jam 26a, lemon curd 26b and white icing 26c piped in turn along its troughs, but not extending over its peaks 25a. A cross-section through a similar biscuit is shown on a larger scale in FIG. 21 in which the same reference numerals are used as in FIG. 19.

Figure 22:
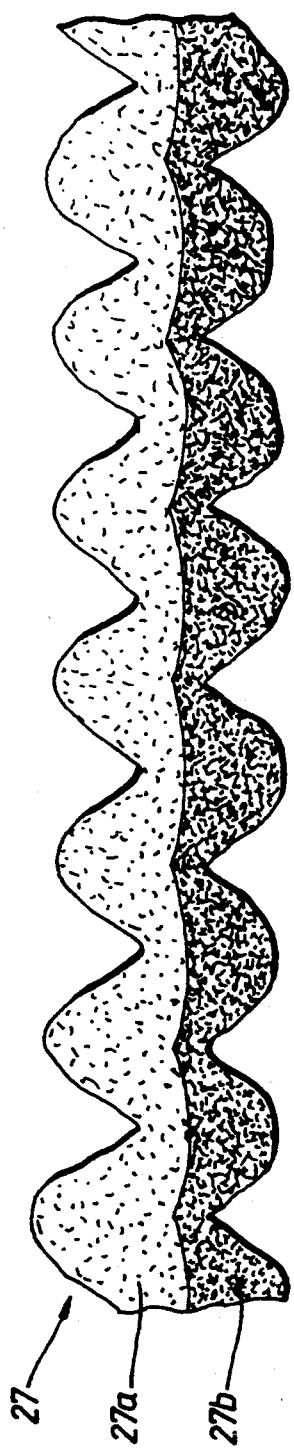
FIG. 22 is an enlarged cross-section through a biscuit having two layers of different doughs laminated together.

FIG. 22 shows a cross-section through a biscuit 27 which has been made from two sheets of dough 27a and 27b fed, one on top of the other, to the corrugated rollers 6 where they were laminated to form a single, layered, corrugated sheet. The compositions of the doughs forming the layers 27c and 27b are such that the layers are of different colours, the lower layer 27b containing cocoa and being of a darker colour than the upper layer 27a.

Figure 23:
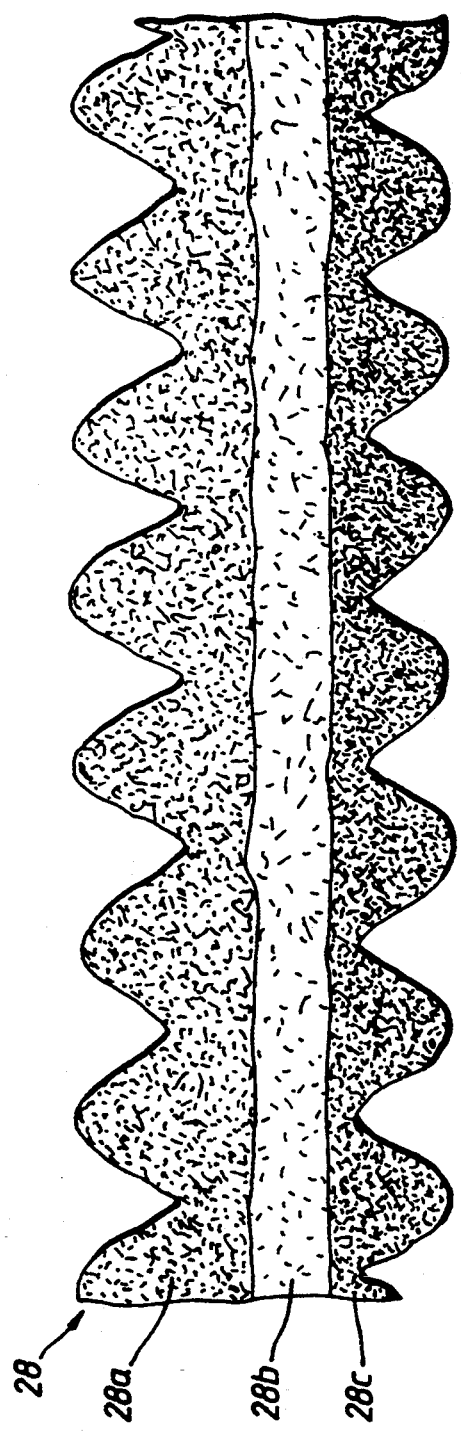
FIG. 23 is an enlarged cross-section through a biscuit having three layers of dough laminated together.

A biscuit 28, formed in a similar manner to the biscuit 27, but from three layers of dough 28a, 28b and 28c, respectively, is shown in FIG. 23. In that biscuit the upper and lower layers 28a and 28c contain cocoa and are darker in colour than the intermediate layer 28b, so that the biscuit 28 resembles a sandwich.

Substantially no delamination of the layers of dough occurred during baking of the biscuits 27 and 28.

FIG. 24 shows a biscuit 29 made from two layers of dough 29a and 29b, respectively, each having the same composition. Before the layer 29a was placed on the layer 29b, a layer of chocolate paste 29c was spread over the upper surface of the layer 29b. The resulting layers of dough were then passed through the corrugated rollers 6.

FIG. 25 shows a biscuit 30 similar to the biscuit 29, but in which the intermediate layer 30c of paste was a layer of raisin paste.

Figure 26:
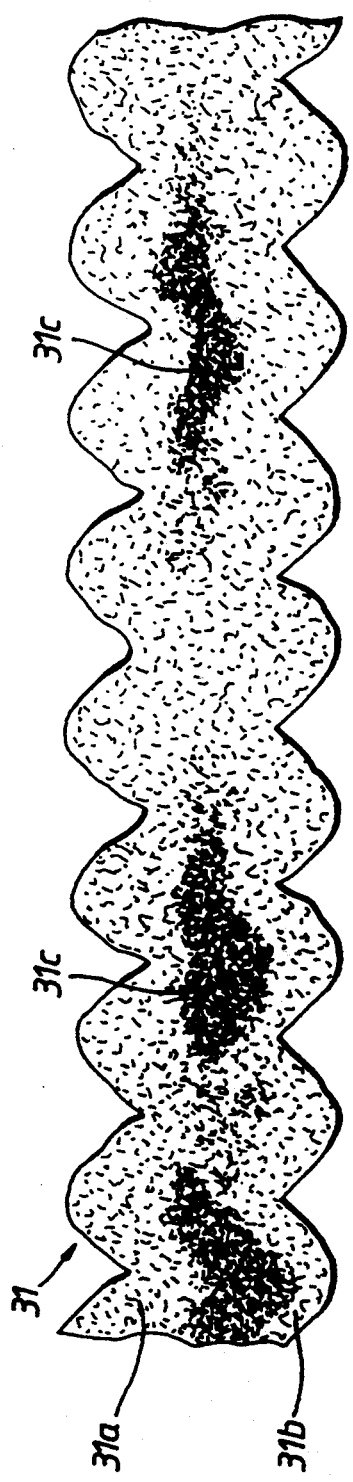
FIG. 26 is an enlarged cross-section of a biscuit with inclusions.

A biscuit 31 shown in FIG. 26 is, similarly to the biscuits 28 and 29, made from two layers of dough 31a and 31b, but instead of an intermediate layer of paste, inclusions, in this case, sultanas 31c, were sprinkled over the upper surface of the lower sheet 31b before the upper sheet was placed on top and the resulting layers were fed to the corrugated rollers.

Figure 27:
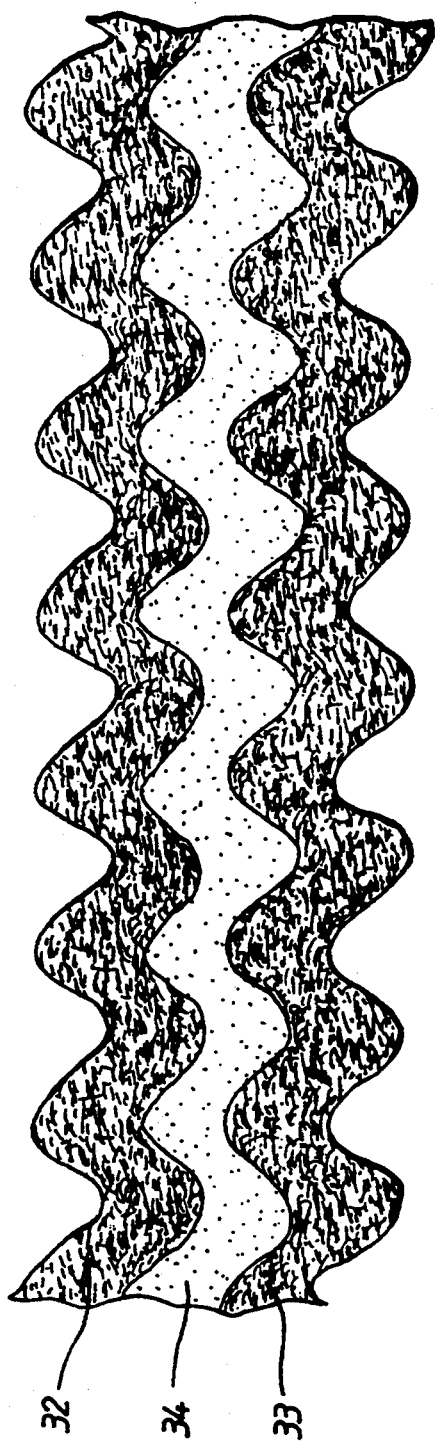
FIG. 27 is an enlarged cross-section through a composite biscuit comprising two individual biscuits and an intermediate filling layer.

FIG. 27 shows a composite biscuit composed of two individual, separate biscuits 32 and 33, respectively, each in accordance with the invention, between which was placed a layer of cream filling 34 to form a "sandwich" biscuit.

The following Examples illustrate the invention:

EXAMPLE 1

Using apparatus as hereinbefore described with reference to FIG. 1 of the accompanying drawings, the amplitude and wavelength of the roller corrugations being 1 mm and 4 mm, respectively, and the separation of the corrugated rollers being 1.99 mm, a planar sheet of dough was formed and subsequently corrugated, the composition of the dough being as follows (all the percentages being by weight and based on the weight of the dough):

| Flour (biscuit) | 55.3% |
|---|---|
| Salt | 1.96% |
| Water | 42.69% |

The corrugated sheet of dough was cut into circular pieces having a diameter of 63 mm, which were fed to an oven which was divided into three sections in which the pieces were baked to form biscuits.

The average fracture ratio of the biscuits, based on measurements on five pairs of biscuits, was 2.5. The average weight of a sample of ten biscuits was 5.0 g.

The corrugation retention index of one of the biscuits was measured and found to be 83/74.

The biscuits were judged to have an interesting appearance with a crunchy texture, and not to be unacceptably hard.

EXAMPLE 2

A planar sheet of dough was formed, the composition of the dough being as follows (all the percentages being by weight and based on the weight of the dough:

| | |
|---|---|
| Flour (biscuit) | 67.0% |
| Fat/Butter | 6.63% |
| Salt | 1.25% |
| Water | 24.31% |
| Herbs & Spices | 0.53% |

The planar sheet of dough, which had a thickness of 4.0 mm, was fed through corrugated rollers and cut to form individual pieces, which were then baked to form biscuits, all as hereinbefore described with reference to FIG. 1 of the accompanying drawings. The amplitude and wavelength of the roller corrugations were 1 mm and 4 mm, respectively, and the separation of the corrugated rollers was 1.99 mm.

The corrugated sheet of dough was cut into circular pieces having a diameter of 63 mm, which were fed to an oven in which they were baked to form biscuits.

The average fracture ratio of the biscuits, based on measurements on five pairs of biscuits, was 2.2.

The biscuits were judged to have an interesting appearance with a crunchy texture, and not to be unacceptably hard.

EXAMPLE 3

A planar (or flat) sheet of dough was formed, the composition of the dough being as follows (all the percentages being by weight and based on the weight of the dough):

| | |
|---|---|
| Flour | 59.41% |
| Sugar (in solid form) | 14.01% |
| Salt | 0.749% |
| Sodium bicarbonate | 0.389% |
| Malt | 1.405% |
| Syrup | 1.561% |
| Fat | 11.923% |
| Water | 10.24% |
| Ammonium bicarbonate | 0.286% |
| Sodium metabisulphite | 0.01% |

The planar sheet of dough, which had a thickness of 4 mm, was fed through corrugated rollers and cut to form individual pieces, which were then baked to form biscuits, all as hereinbefore described with reference to FIG. 1 of the accompanying drawings. The amplitude and wavelength of the roller corrugations were 1.5 mm and 6 mm, respectively, and the separation of the corrugated rollers was 1.99 min.

The corrugated sheet of dough was cut into circular pieces having a diameter of 63 mm, which were fed to an oven in which they were baked to form biscuits.

The average fracture ratio of the biscuits, based on measurements on five pairs of biscuits, was 2.0. The corrugation retention index was 76/59.

The biscuits were judged to have an interesting appearance with a crunchy texture, and not to be unacceptably hard.

EXAMPLE 4

A planar sheet of dough having a thickness of 4.4 mm was formed, the composition of the dough being as follows (all the percentages being by weight and based on the weight of the dough):

| | |
|---|---|
| Fat/Butter | 10.1% |
| Glucose | 1.0% |
| Invert sugar | 13.47% |
| Malt | 1.00% |
| Whey Powder | 0.61% |
| Sodium metabisulphite | 0.02% |
| Water | 10.752% |
| Salt | 0.50% |
| Sodium bicarbonate | 0.21% |
| Ammonium bicarbonate | 1.57% |
| Flour | 60.9% |

The planar sheet of dough was fed through corrugated rollers and cut to form individual pieces, which were then baked to form biscuits, all as hereinbefore described with reference to FIG. 1 of the accompanying drawings. The amplitude and wavelength of the roller corrugations were 1.5 mm and 6 mm, respectively, and the separation of the corrugated rollers was 1.99 min.

The corrugated sheet of dough was cut into circular pieces having a diameter of 63 mm, which were fed to an oven in which they were baked to form biscuits.

The average fracture ratio of the biscuits, based on measurements on five pairs of biscuits, was 2.45. The corrugation retention index was 74/63.

The biscuits were judged to have an interesting appearance, a crunchy texture, and not to be unacceptably hard.

EXAMPLE 5

Biscuits were made from a dough having the following

| | wt(g) |
|---|---|
| Butter | 141 |
| Glucose | 14 |
| Invert sugar | 188 |
| Malt | 14 |
| Whey powder | 9 |
| Sodium metabisulphite | 0.3 in 3 ml water |
| Salt | 7.3 |
| Soda | 3 |
| Ammonium bicarbonate | 22 |
| Water | 150 |
| Flour (biscuit) | 850 |

In the first dough-forming step, the sodium metabisulphite was dissolved in water, and added to butter, glucose, invert sugar, malt and whey. Those ingredients were mixed for 1.5 minutes in a Vicars II high speed mixer with a sprag blade configuration, the mixer being set to operate at its "fast" speed (60 r.p.m.).

In the second dough-forming step, salt, sodium bicarbonate and ammonium bicarbonate were dissolved in water. Flour was added, and the whole was mixed, in the mixer referred to above, for 0.5 minute with the mixer set to operate at its "slow" speed (30 r.p.m.) followed by four minutes of mixing at its "fast" speed (60 r.p.m.). The final dough temperature was 30° C.

The dough was then formed into a sheet which was in turn cut into individual portions, using apparatus as shown in FIG. 1. The gaps between the various rollers were as follows:

The three-roll sheeter: 9.02 mm
The first gauge rollers: 4.88 mm
The second gauge rollers: 3.03 mm
The third gauge rollers: 0.95 mm
The corrugated rollers: 0.9 mm The individual, circular pieces of dough (which had a diameter of 63 mm) were fed to a forced convection travelling baking oven, which was divided into three sections. The temperatures in the first, second and third sections of the oven were 200° C., 190° C. and 140° C., respectively. The baking time was 6 minutes.

The average fracture ratio of the biscuits, based on measurements on five pairs of biscuits, was 2.5. The corrugation retention index was 71/65.

The biscuits were judged to have an interesting appearance, with a crunchy texture, and not to be unacceptably hard.

EXAMPLE 6

Biscuits were made from a dough having the following composition (all the percentages being by weight and based on the weight of the dough):

|  | % |
| --- | --- |
| Biscuit flour | 55.76 |
| Icing Sugar | 13.16 |
| Salt | 0.7 |
| Soda | 0.36 |
| Malt | 1.32 |
| Syrup | 1.46 |
| Fat | 11.19 |
| Water | 9.91% |
| Ammonium bicarbonate | 0.24 |
| Sodium metabisulphite | 0.017 |
| Raisins | 2.88 |
| Chopped Nuts | 2.88 |

The peanuts and raisins constituted inclusions in the dough.

Using apparatus as hereinbefore described with reference to FIG. 1 of the accompanying drawings, the dough was formed into a planar sheet and fed through corrugated rollers.

The corrugations, as seen in profile, were the same on each of the two corrugated rollers, and were in the form of triangular teeth. The amplitude of the corrugations was 3 mm and their wavelength was 6 mm. Accordingly, the included angle at the apex of each of the triangles making up the corrugated profile was 53°.

The thickness of the planar sheet of the dough was measured, using callipers, after the sheet had left the last set of gauge rollers and before it entered the corrugated rollers, and was found to be 3 mm. The separation between the corrugated rollers was 1.9 mm.

The fracture ratio of the circular biscuits, based on measurements on five pairs of biscuits, was 2.6. The corrugation retention index was 88/64.

The biscuits were judged to have an interesting appearance, with a crunchy texture and not to be unacceptably hard.

EXAMPLE 7

Biscuits were made from two doughs, which were each formed substantially as described in Example 6, except that they did not contain nuts or raisins, and which were brought together, one superposed on the other, after they had left the respective last pairs of gauge rollers, and before they entered the nip between a common pair of corrugated rollers.

The composition of the dough used to form the upper of the two sheets was the same as the composition of the dough used in Example 6 herein. The dough of which the lower of the two sheets was formed was obtained by adding cocoa powder to dough of the composition used to form the upper of the two sheets, the weight of the cocoa powder so added being equal to 10% of the weight of the dough to which it was added.

The thickness of the two sheets of dough were measured, using callipers, after they had left the respective last pair of gauge rollers and before they were brought into contact with one another, and in each case the thickness was found to be 2.16 mm.

The configuration and separation of the corrugated rollers were the same as in Example 6. Circular pieces were then cut from the corrugated dough using a circular cutter having a diameter of 63 mm, and were baked.

The average weight of a sample of ten of the resulting circular biscuits was 10.31 g, and their fracture ratio, based on measurements on five pairs of biscuits, was 2.1. The corrugation retention index was 74/53.

The biscuits were judged to have an interesting appearance with a crunchy texture, and not to be unacceptably hard.

EXAMPLE 8

Biscuits were made from two sheets of dough and a filling, the dough used in each sheet having the same composition as that used for the upper sheet described in Example 7, and the filling being a filling of raisin paste.

The weight of the filling constituted 10.6% of the total weight of the paste and dough.

The two sheets of dough were formed substantially as described in Example 7. The filling was applied uniformly to the upper surface of the lower sheet of dough after it had left the last pair of respective gauge rollers, but before it had met the upper sheet. That gave a sandwich of dough and raisin paste which, when measured using callipers before it entered the corrugated rollers, had a thickness of 6 mm. A piece of the sandwich was cut out, using a circular cutter having a diameter of 63 mm, before the sandwich was fed into the corrugated rollers, and was found to have a weight of 15.61 g.

The amplitude of the corrugations was 2.25 mm, the wavelength of the corrugations was 6 mm and the separation of the corrugated rollers was 1.9 mm.

Circular pieces of the corrugated dough were then cut from the corrugated sheet using a circular cutter having a diameter of 63 mm, and were baked.

The average weight of a sample of ten of the resulting circular biscuits was 11.65 g and their average fracture ratio, based on measurements on five pairs of biscuits, was 2.77. The corrugation retention index was 67/52.

EXAMPLE 9

Biscuits were made using a dough having the same composition as that used in Example 6, except that the inclusions were omitted, and by the method described in Example 6, except that the amplitude of the corrugations was 1.0 mm and the wavelength was 4.0 mm. The weight of the circular biscuits was 3.5 g, and their average fracture ratio, based on measurements on five pairs of biscuits, was 2.7.

A layer of a cream filling material was then applied to the upper surfaces of some of the circular biscuits. Others of the circular biscuits were then placed on the layers of cream filling material to produce composite, or so-called "sandwich" biscuits. Each of the composite biscuits was made up of two of the circular biscuits separated from one another by a layer of cream filling material.

The quantity of cream filling material used was such that, of the total weight of a composite biscuit, the cream filling material accounted for 30% by weight, so that the average weight of a sample of the composite biscuits was 9.1 g.

The composition of the cream filling material (all the percentages being by weight and based on the weight of the cream filling material) was as follows:

| Cream fat | 34.7% |
|---|---|
| Icing sugar | 60.5% |
| Wheat starch | 4.0% |
| Flavouring material | 0.42% |
| Colouring material | 0.33% |

What we claim is:

1. A process for producing biscuits, which comprises the steps of:
    (a) forming a biscuit dough into a flat sheet;
    (b) feeding that sheet to a pair of corrugated rollers which impart a corrugated configuration to the sheet; and
    (c) cutting from the corrugated sheet generally laminar portions each having a corrugate configuration; and
    (d) baking the portions to form biscuits each having a corrugated configuration, the corrugated configuration of the biscuits being such that they have a fracture ratio, which is the ratio of the resistance to breaking of the biscuit in a direction perpendicular to the direction in which the corrugations extend to the resistance to breaking of the biscuits in the direction along with the corrugations extend, of at least 1.5.

2. A process as claimed in claim 1, wherein the corrugated configuration of the biscuits is such that their fracture ratio is at least 2.0.

3. A process as claimed in claim 1, wherein the corrugated configuration of the biscuits is such that their fracture ratio is at most 4.0, preferably, at most 3.0.

4. A process as claimed in claim 1, wherein the corrugated rollers are corrugated by virtue of their having circumferentially extending peaks and troughs, so that they are corrugated in an axial direction.

5. A process as claimed in claim 1, wherein the corrugated configuration imparted to the sheet in step (b) retained in the corrugated configuration of the biscuits baked in step (d) is expressed by x/y or corrugation retention index, where x is a measure, expressed as a percentage of the corrugations in the upper surface, and y is a corresponding measure of retention, expressed as a percentage, of the corrugations in the lower surface, and is at least 60/50.

6. A process as claimed in claim 5, wherein the corrugation retention index is at least 70/60.

7. A process as claimed in claim 1, wherein the corrugated sheet has corrugations having a wavelength and dimensions of the portions cut from the corrugated sheet such that, each surface of each portion has at least five corrugations.

8. A process as claimed in claim 7, wherein each surface of each portion has at least eight and not more than fifteen corrugations.

9. A process as claimed in claim 1, wherein the corrugated sheet of dough has an initial corrugated configuration with corrugations that are substantially uniform and have a wavelength within the range of from 2 to 10 mm.

10. A process as claimed in claim 1, wherein the corrugated sheet of dough in its initial corrugated configuration has a thickness within the range of from 1.5 mm to 5 min.

11. A process as claimed in claim 1, wherein the corrugated sheet of dough in its initial corrugated configuration has two bounding surfaces with corrugations having an amplitude within the range of from 0.5 to 4 mm.

12. A process as claimed in claim 1, wherein the corrugated sheet of dough in its initial corrugated configuration has two bounding surfaces with corrugations having an amplitude within the range of from 0.25 to 2.5 times the thickness of the initial corrugated configuration.

13. A process as claimed in claim 1, wherein the dough has a fat content which does not exceed 20% by weight based on the weight of the dough.

14. A process as claimed in claim 13, wherein the fat content of the dough does not exceed 15% by weight based on the weight of the dough.

15. A process as claimed in claim 1, wherein the dough has a sugar content which does not exceed 18% by weight based on the weight of the dough.

16. A process as claimed in claim 1, wherein the dough has a sugar content which does not exceed 15% by weight based on the weight of the dough.

17. A process as claimed in claim 16, wherein the dough has a fat content which does not exceed 7.5% by weight based on the weight of the dough, and the fracture ratio of the biscuit is at least 2.0.

18. A process as claimed in claim 1, wherein the dough has a fat content which is at least 15% by weight based on the weight of the dough, and a sugar content which does not exceed 15% by weight based on the weight of the dough.

19. A process as claimed in claim 1, wherein the dough has a sugar content of at least 15% by weight based on the weight of the dough, and a fat content which does not exceed 12% by weight based on the weight of the dough.

20. A process as claimed in claim 1, wherein the dough has inclusions admixed with it prior to corrugation 21. A process as claimed in claim 1, wherein the biscuits are made from a plurality of sheets of dough which are fed, one on top of another, to a pair of corrugated rollers, where the sheets are laminated to form a single, layered, corrugated sheet.

22. A process as claimed in claim 21, wherein inclusions are placed between the sheets of dough before the sheets of dough are fed to the corrugated rollers.

23. A process as claimed in claim 21, wherein a layer of flavoured paste is spread on one of the sheets and another sheet placed on top of it before the sheets of dough are fed to the corrugated rollers.

24. A biscuit having a corrugated configuration and a ratio of the resistance to breaking of the biscuit in a direction perpendicular to the direction in which the corrugations extend to the resistance to breaking of the biscuit in the direction along which the corrugations extend or fracture ratio of the biscuit of at least 1.5.

25. A biscuit as claimed in claim 24 having a fat content not extending 25% by weight based on the weight of the biscuit.

26. A biscuit as claimed in claim 24, of which the fracture ratio is at least 2.0.

27. A process for producing biscuits, which comprises the steps of:
   (a) forming a biscuit dough into a flat sheet;
   (b) feeding that sheet to a pair of corrugated rollers which impart a corrugated configuration to the sheet;
   (c) cutting generally laminar portions from the sheet; and
   (d) baking the portions to form biscuits having a fat content not exceeding 25% by weight based on the weight of the biscuits, each of the biscuits having a corrugated configuration such that it has a fracture ratio of at least 1.5.

28. A process as claimed in claim 27, wherein the fat content of the dough does not exceed 7.5% by weight based on the weight of the dough, and each of the biscuits has a fracture ratio of at least 2.0.

29. A process for producing biscuits, which comprises the steps of:
   (a) forming a biscuit dough into a flat sheet, the dough having a total sugar content of at least 10% by weight based on the weight of the dough;
   (b) feeding that sheet to a pair of corrugated rollers which impart a corrugated configuration to the sheet;
   (c) cutting generally laminar portions from the sheet; and
   (d) baking the portions to form biscuits each having a corrugated configuration, the corrugated configuration of the biscuits being such that they have a fracture ratio of at least 1.5.

30. A process as claimed in claim 29, wherein the dough has a fat content not exceeding 20% by weight based on the weight of the dough.

* * * * *

UNITED STATES PATENT AND TRADEMARK OFFICE
CERTIFICATE OF CORRECTION

PATENT NO. : 5,419,903
DATED : May 30, 1995
INVENTOR(S) : Evans, et al

It is certified that error appears in the above-indentified patent and that said Letters Patent is hereby corrected as shown below:

Column 15, line 18, delete "b" and replace by -- $\bar{b}$ --; line 19; delete "d" and replace by -- $\bar{d}$ --; line 22, in the formula, delete "b" and "d" and replace by -- $\bar{b}$ -- and -- $\bar{d}$ --, respectively.

Column 21, line 31, delete "corrugate" and replace by --corrugated--, and line 58, insert -- , -- after "percentage".

Column 22, line 12, delete "min" and replace by --mm--.

Signed and Sealed this

Nineteenth Day of September, 1995

BRUCE LEHMAN

*Attest:*

*Attesting Officer*     *Commissioner of Patents and Trademarks*